US006831642B2

(12) United States Patent
Mech

(10) Patent No.: US 6,831,642 B2
(45) Date of Patent: Dec. 14, 2004

(54) METHOD AND SYSTEM FOR FORMING AN OBJECT PROXY

(75) Inventor: Radomir Mech, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 123 days.

(21) Appl. No.: 10/197,822

(22) Filed: Jul. 19, 2002

(65) Prior Publication Data

US 2004/0012587 A1 Jan. 22, 2004

(51) Int. Cl.[7] .............................................. G06T 15/00
(52) U.S. Cl. ...................................................... 345/420
(58) Field of Search ................................ 345/418, 419, 345/420, 428, 581, 619

(56) References Cited

U.S. PATENT DOCUMENTS 6,075,538 A * 6/2000 Shu et al. .................... 345/419
6,100,893 A * 8/2000 Ensz et al. ................... 345/420

OTHER PUBLICATIONS

Rheingans et al., Volume Illustration: Nonphotorealistic Rendering of Volume Models, IEEE Transactions on Visualization and Computer Graphics, vol. 7, No. 3 Jul. 9, 2001, pp. 253–264.*
Buehler, C. et al, "Unstructured Lumigraph Rendering", published at SIGGRAPH 2001, Los Angeles, CA, Aug. 2001 (eight pages).
Sander P.V. et al., "Silhouette Clipping", published at SIGGRAPH 2000, New Orleans, LA, Jul. 2000 (eight pages).

* cited by examiner

*Primary Examiner*—Phu K. Nguyen
(74) *Attorney, Agent, or Firm*—Sterne, Kessler, Goldstein & Fox P.L.L.C.

(57) ABSTRACT

A system, method and computer program product for forming an object proxy. In one embodiment, a method forms an object proxy that approximates the geometry of an object. The method includes forming a volume that encompasses the object, forming an isosurface within the volume, adjusting the isosurface relative to a surface of the object, and pruning the isosurface to obtain the object proxy. An apparatus includes an isosurface former that forms an isosurface within a volume encompassing an object, and an isosurface shaper that adjusts the isosurface relative to the surface of the object and prunes the isosurface to obtain the object proxy.

28 Claims, 16 Drawing Sheets

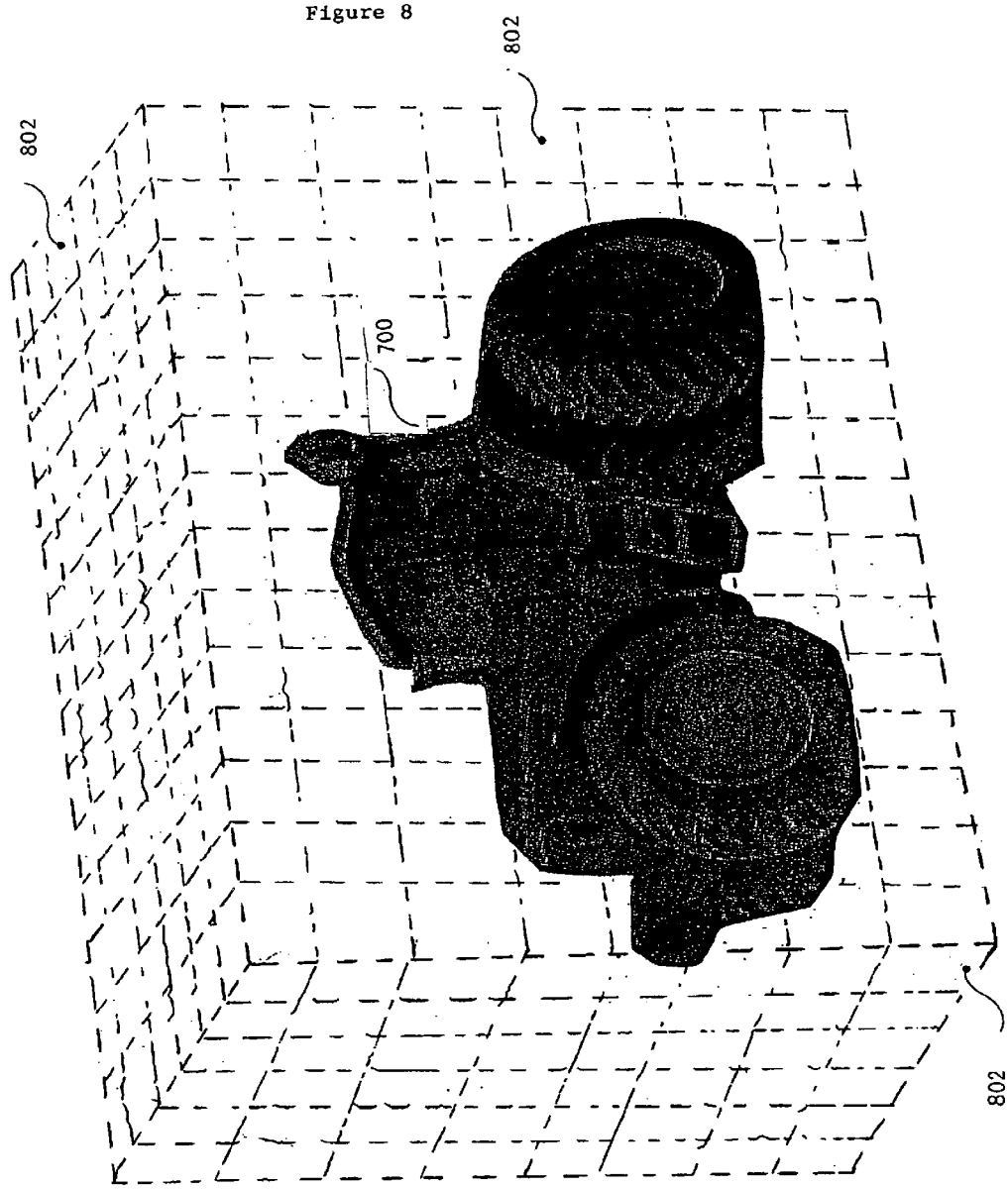

METHOD AND SYSTEM FOR FORMING AN OBJECT PROXY

CROSS-REFERENCE TO RELATED APPLICATIONS

This application is related to a commonly-owned, co-pending application by Mech, "System and Method for Image-Based Rendering with Object Proxies," U.S. Appl. No. to be assigned, filed herewith, and incorporated by reference herein in its entirety.

BACKGROUND OF THE INVENTION

1. Field of the Invention

The present invention relates to computer graphics.

2. Related Art

A wide variety of applications rely on computer graphics to generate images. An image is made up of an array of picture elements (pixels) and can be displayed on a display unit, such as, a monitor, screen, or cathode ray tube. Images often include graphical representations of objects. Many different types of computing devices with graphics capabilities are used to generate images. Such computing devices use graphics processing. A combination of software, firmware and/or hardware is used to implement graphics processing. For example, graphics processing including rendering can be carried out in a graphics card, graphics subsystem, graphics processor, graphics or rendering pipeline, and/or a graphics application programming interface (API) and libraries, such as, OPENGL.

In computer graphics, the geometry of an object is represented by primitives. Common primitives are points, lines, and polygons such as triangles or quads. Each primitive is made up of points called vertices. Each vertex includes information relating to the object and its graphical display as an image. For example, vertex information can include, but is not limited to, vertex coordinates, texture coordinates, an alpha value, and a depth value. Vertex coordinates define the location of a respective vertex in a three-dimensional coordinate space (x,y,z), such as, an object coordinate space or a world coordinate space. In this way, vertex coordinates define the geometry of an object surface. Texture coordinates are coordinates that map to an image in a two-dimensional space (s,t) or a three-dimension space (r,s,t). One way this image (also called a texture) is used in graphics processing is to provide additional surface detail to the object. An alpha value is used to represent transparency information. The depth value is used to define depth information.

Increasing demands are being made upon graphics processing. These demands include realism, speed and cost. Realistic images are desired to be rendered at real-time, interactive rates while avoiding burdensome graphics processing or hardware requirements. One way to achieve more realism is to use complex objects. Complex objects, however, can involve a large number of primitives. For example, hundred, thousands, or millions of triangles may be needed to represent complex objects. This increases the number of calculations and other processing work required to render the object.

One approach to accommodating these demands is to approximate geometric information by forming an object proxy. Conventional approaches to forming an object proxy, however, have been limited. For example, Buehler et al. describes use of geometric proxies based on a progressive hull technique described by Sander et al. See, Buehler et al., "Unstructured Lumigraph Rendering," SIGGRAPH 2001, Los Angeles, Calif., August 2001 (pages 1–8); and Sander et al., "Silhouette Clipping," SIGGRAPH 2000, New Orleans, La., July 2000 (pages 1–8). The progressive hull approach described in the Buehler and Sander articles has significant deficiencies. At the very least, the approach does not apply generally to all types of object shapes. This progressive hull approach cannot handle concave proxies, or objects that have parts close to each other or touching each other. In addition, this approach is not well suited for mixing image-based rendering (ibr) objects with regular scenes.

What is needed is a method and system for forming object proxies which can be used with all types of object shapes.

SUMMARY OF THE INVENTION

The present invention overcomes each of the above-identified problems and has additional advantages as described herein. The present invention provides a system, method and computer program product for forming object proxies. In one embodiment, a method forms an object proxy that approximates the geometry of an object. The method includes forming a volume that encompasses the object, forming an isosurface within the volume, adjusting the isosurface relative to a surface of the object, and pruning the isosurface to obtain the object proxy. The formed volume is made up of voxels that encompass the object. The isosurface forming step includes determining sets of vertices for the voxels such that the sets of vertices define polygons representing the isosurface at a first distance from the surface of the object.

According to a feature of the method of the present invention, the isosurface adjusting step includes adjusting at least some of the vertices of the isosurface until each vertex is at or near a second distance from the surface of the object. In one embodiment, each vertex is iteratively advanced by an amount based on a first distance, a second distance, and direction information.

According to a further feature, the isosurface pruning step includes pruning the isosurface based on a distance condition and an intersection condition. In one embodiment, a list of vertices of the isosurface is iteratively pruned. This pruning includes selecting a vertex, and determining whether the selected vertex can be eliminated from the isosurface based on a distance condition and an intersection condition. When a selected vertex can be eliminated, the vertex is eliminated and new edges are created using remaining vertices.

Another feature of the method includes a step of iteratively moving vertices in the initial object proxy closer to the surface of the object. In one example, after pruning to obtain an initial object proxy, the distance of a respective vertex to the object surface is computed. Each vertex of the initial object proxy is advanced toward the object surface until each vertex is on or near the object surface with no polygons deeper than a predetermined distance or until a predetermined number of iterations has been reached.

According to further feature, object proxy formation parameters can be user-specified and/or predetermined. These object proxy formation parameters include: a grid resolution (N1×N2×N3) representing the resolution of voxels in a volume, a first distance value (D1) representing the first distance between an initial isosurface and the object surface, a second distance value (D2) representing the distance between an initial object proxy obtained after pruning and the object surface, a third distance value (D3) representing the maximum allowed distance between a vertice in the isosurface and the object surface during pruning, and a fourth distance value (D4) representing a maximum depth for vertices from the object surface.

The present invention also provides an apparatus for forming an object proxy that approximates the geometry of an object. The apparatus includes an isosurface former that forms an isosurface within a volume encompassing an object, and an isosurface shaper that adjusts the isosurface relative to the surface of the object and prunes the isosurface to obtain the object proxy.

Other embodiments include a system and a computer program product. The system forms an object proxy that approximates the geometry of an object. The system includes: means for forming a volume that encompasses the object; means for forming an isosurface within the volume; means for adjusting the isosurface relative to a surface of the object; and means for pruning the isosurface to obtain the object proxy. The computer program product includes computer usable media having computer readable program code embodied in said media for causing a processor to form an object proxy. The computer readable program code has first program code that enables the processor to form a volume that encompasses the object; second program code that enables the processor form an isosurface within the volume; third program code that enables the processor to adjust the isosurface relative to a surface of the object; and fourth program code that enables the processor to prune the isosurface to obtain the object proxy.

The present invention has general application as it can be used to form object proxies for all types of object shapes. The present invention also forms an object proxy that approximates object geometry and reduces the processing work required at run-time. For example, the object proxy can have less polygons and associated vertices than the original object. In this way, rendering of the object based on the object proxy can be carried out for display or animation in real-time at an interactive rate even on cheaper graphics hardware. Compared to a general mesh simplification algorithm, object proxies formed according to the present invention are assured to have no or minimal interaction with an object, which is especially advantageous in hardware-accelerated image-based rendering.

Another advantage is that present invention allows object formation parameters to be user-specified (or set by default) so that the degree in which the isosurface shape approximates the original object surface can be adjusted depending upon a particular application or need. Forming object proxies according to the present invention also make it possible both to render more image-based objects in a single computer generated scene and to render these image-based objects using fewer views/textures than conventional image-based rendering schemes.

Further embodiments, features, and advantages of the present invention, as well as the structure and operation of the various embodiments of the present invention are described in detail below with reference to accompanying drawings.

BRIEF DESCRIPTION OF THE FIGURES

The present invention is described with reference to the accompanying figures. In the figures, like reference numbers indicate identical or functionally similar elements. Additionally, the leftmost digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

FIG. 8 illustrates an example volume encompassing the object of FIG. 7 according to an embodiment of the invention.

DETAILED DESCRIPTION OF THE INVENTION

The present invention provides a method, a system, and a computer program product for forming a proxy of an object (herein after an object proxy). An object proxy is a simplification of an object boundary. An object proxy is useful for any type of rendering including, but not limited to, hardware-accelerated image-based rendering.

Terminology

The following terms are defined so that they may be used to describe embodiments of the present invention. As used herein:

"Pixel" means a data structure, which is used to represent a picture element. Any type of pixel format can be used.

"Real-time" or "Interactive Rate" refers to a rate at which successive display images can be redrawn without undue delay upon a user or application. This can include, but is not limited to, a nominal rate of between 30–60 frames/second. In some example embodiments, such as some flight simulators or some interactive computer games, an interactive rate may be approximately 10 frames/second. In some examples, real-time can be one update per second.

"Texture" means an array of texels. A texel can be a color or an intensity value. A texture can be any array of values that is used to determine a value for a pixel. As used herein, the term "texture" includes, for example, texture maps, bump maps, and gloss maps.

"Texel" means a texture element.

"Texture sample" means a sample selected from a texture map or texture. The sample can represent one texel value or can be formed from two or more texel values blended together. Different weighting factors can be used for each texel blended together to form a texel. The terms "texel" and "texture sample" are sometimes used interchangeably.

"Texture unit" refers to graphics hardware, firmware, and/or software that can be used to obtain a texture sample (e.g., a point sample or a filtered texture sample) from a texture. A texture unit can in some instances obtain multiple texture samples from multiple textures.

Example Architecture of the Invention

Figure 1:
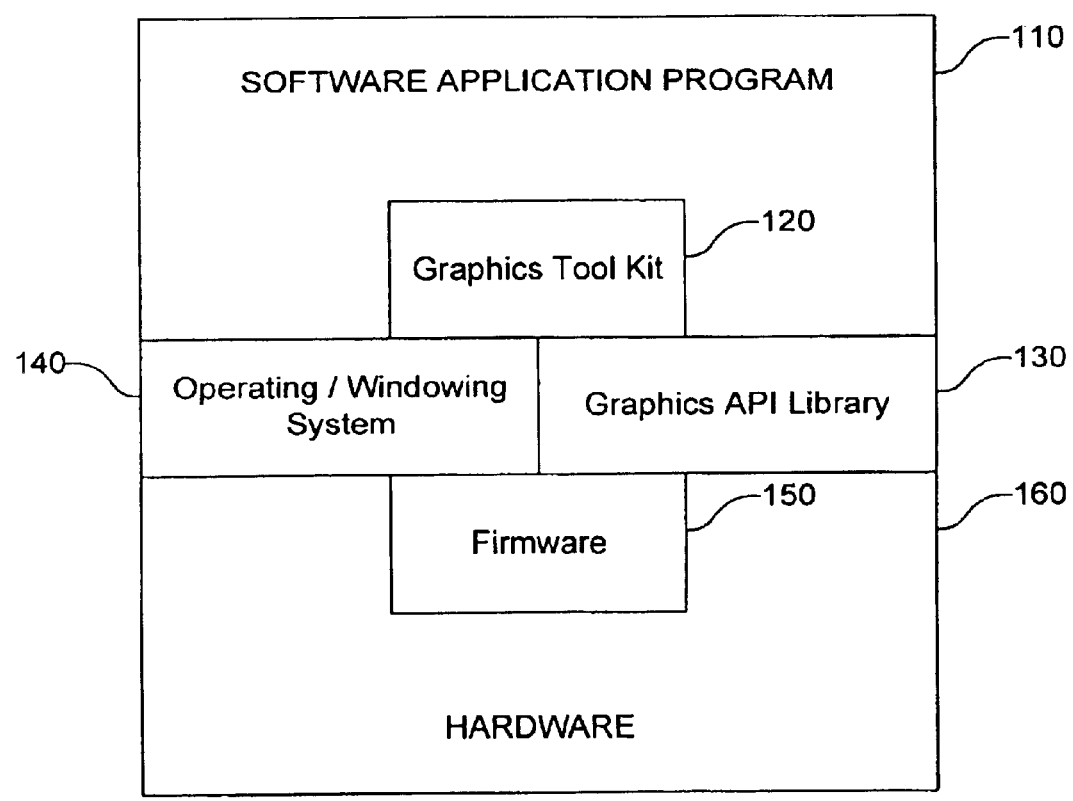
FIG. 1 illustrates an example architecture in which the invention can be implemented.

FIG. 1 illustrates a block diagram of an example computer architecture 100 in which the various features of the present invention can be implemented. It is an advantage of the invention that it may be implemented in many different ways, in many environments, and on many different computers or computer systems.

Architecture 100 includes six overlapping layers. Layer 110 represents a high level software application program. Layer 120 represents a three-dimensional (3D) graphics software tool kit, such as OPENGL PERFORMER. Layer 130 represents a graphics application programming interface (API), which can include but is not limited to OPENGL, available from Silicon Graphics, Incorporated. Layer 140 represents system support such as operating system and/or windowing system support. Layer 150 represents firmware. Finally, layer 160 represents hardware, including graphics hardware. Hardware 160 can be any hardware or graphics hardware including, but not limited to, a computer graphics processor (single chip or multiple chip), a specially designed computer, an interactive graphics machine, a gaming platform, a low end game system, a game console, a network architecture, et cetera. Some or all of the layers 110–160 of architecture 100 will be available in most commercially available computers.

As will be apparent to a person skilled in the relevant art after reading the description of the invention herein, various features of the invention can be implemented in any one of the layers 110–160 of architecture 100, or in any combination of layers 110–160 of architecture 100.

Example System Embodiment of the Present Invention

Figure 2:
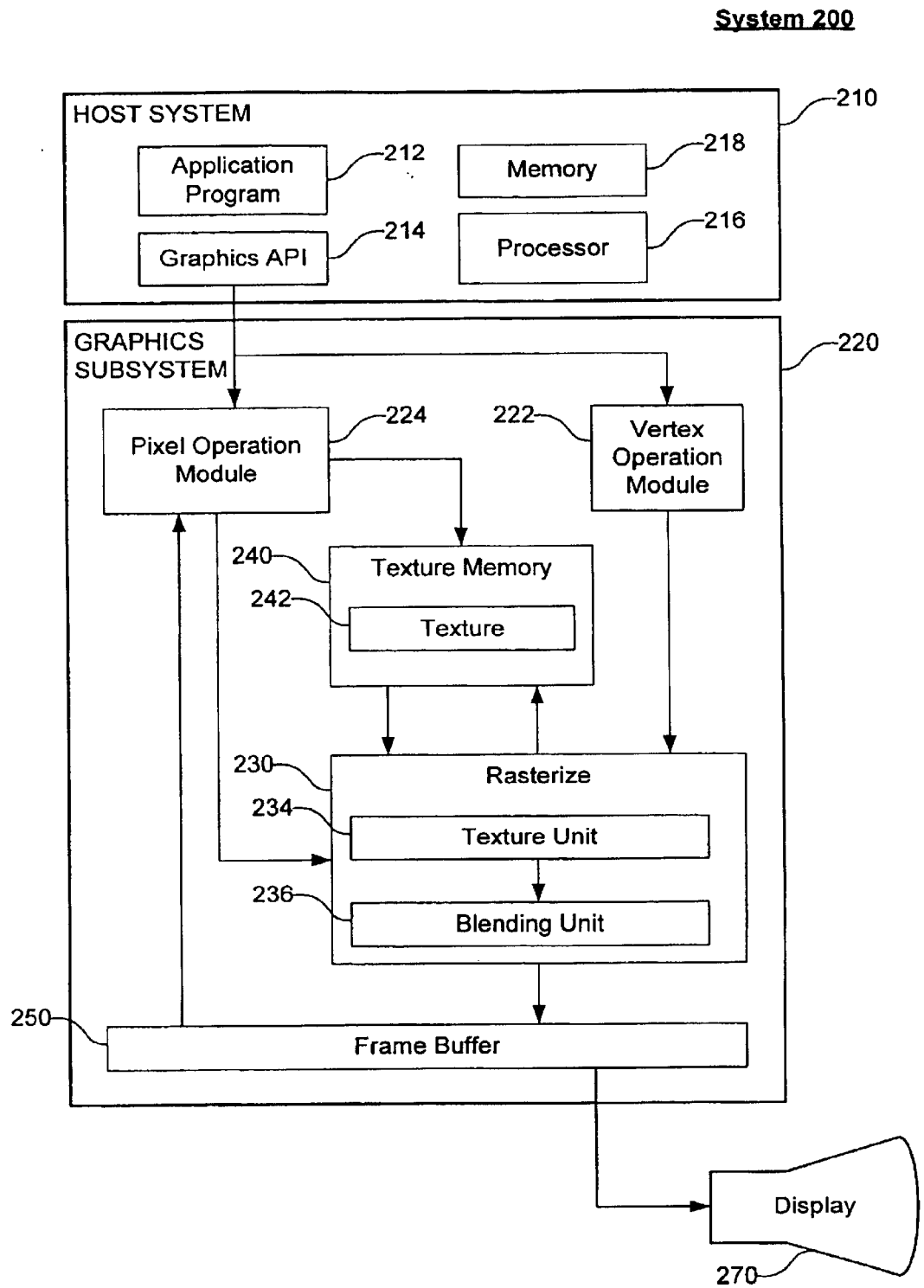
FIG. 2 illustrates an example system according to an embodiment of the invention.

FIG. 2 illustrates an example graphics system 200 according to an embodiment of the present invention. Graphics system 200 comprises a host system 210, a graphics subsystem 220, and a display 270. Each of these features of graphics system 200 is further described below.

Host system 210 comprises an application program 212, a hardware interface or graphics API 214, a processor 216, and a memory 218. Application program 212 can be any program requiring the rendering of a computer image. The computer code of application program 212 is executed by processor 216. Application program 212 assesses the features of graphics subsystem 220 and display 270 through hardware interface or graphics API 214. Memory 218 stores information used by application program 212.

Graphics subsystem 220 comprises a vertex operation module 222, a pixel operation module 224, a rasterizer 230, a texture memory 240, and a frame buffer 250. Texture memory 240 can store one or more textures or images, such as texture 242. Texture memory 240 is connected to a texture unit 234 by a bus (not shown). Rasterizer 230 comprises a texture unit 234 and a blending unit 236. Texture unit 234 and blending unit 236 can be implemented separately or together as part of a graphics processor. The operation of these features of graphics system 200 would be known to a person skilled in the relevant art given the description herein.

In embodiments of the present invention, texture unit 234 can obtain multiple point samples or multiple filtered texture samples from textures and/or images stored in texture memory 240. Blending unit 236 blends texels and/or pixel values according to weighting values to produce a single texel or pixel. The output of texture unit 238 and/or blending unit 236 is stored in frame buffer 250. Display 270 can be used to display images stored in frame buffer 250.

The embodiment of the invention shown in FIG. 2 has a multipass graphics pipeline. It is capable of operating on each pixel of an image (object) during each pass that the image makes through the graphics pipeline. For each pixel of the image, during each pass that the image makes through the graphics pipeline, texture unit 234 can obtain at least one texture sample from the textures and/or images stored in texture memory 240. Although the embodiment of the invention shown in FIG. 2 has a multipass graphics pipeline, it is noted here that other embodiments of the invention do not have a multipass graphics pipeline. As described below, method embodiments of the invention can be implemented using systems that do not have a multipass graphics pipeline.

Example Method Embodiments of the Present Invention

Figure 3A:
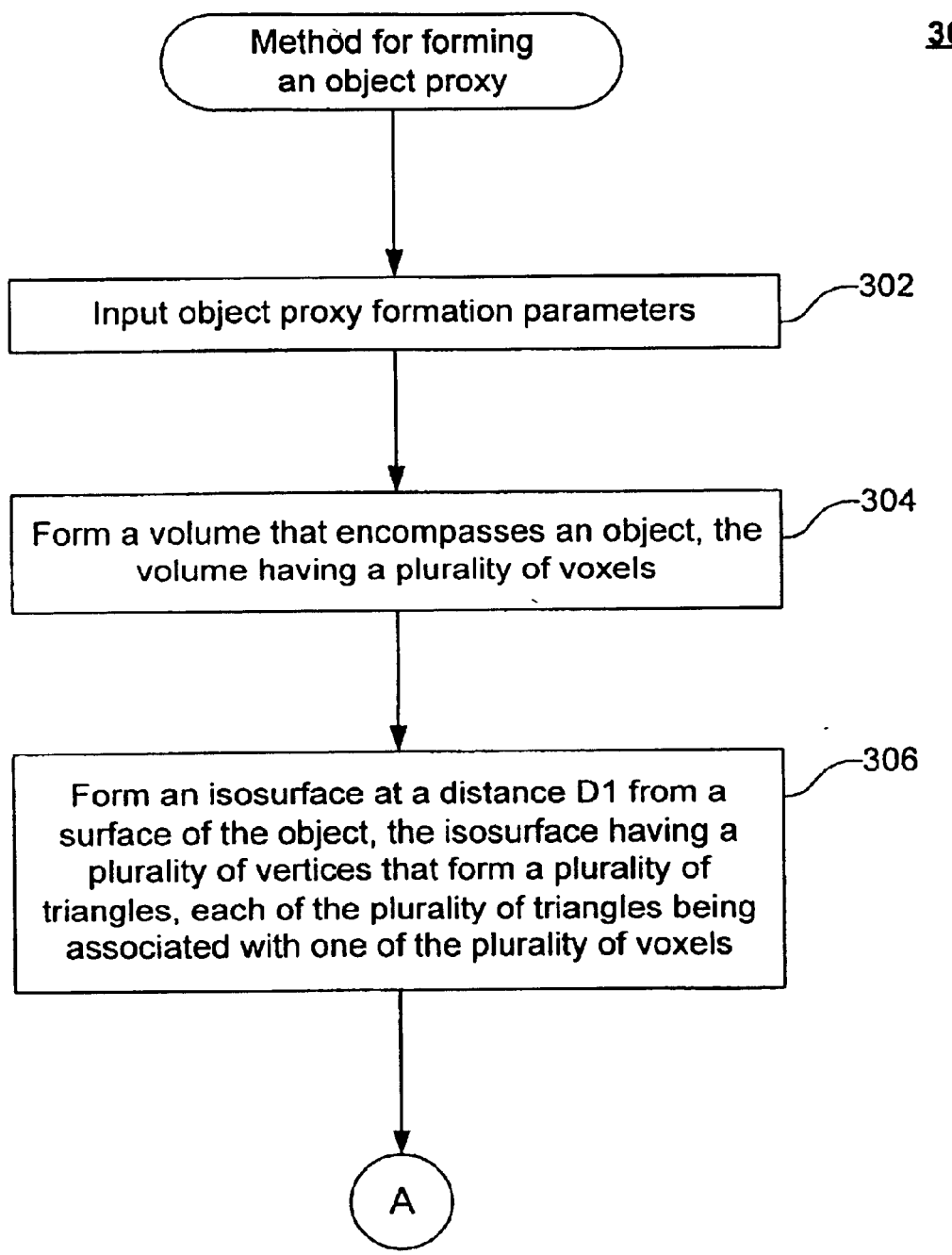
FIGS. 3A–3B illustrate a flowchart of a method for forming an object proxy according to an embodiment of the invention.
Figure 3B:
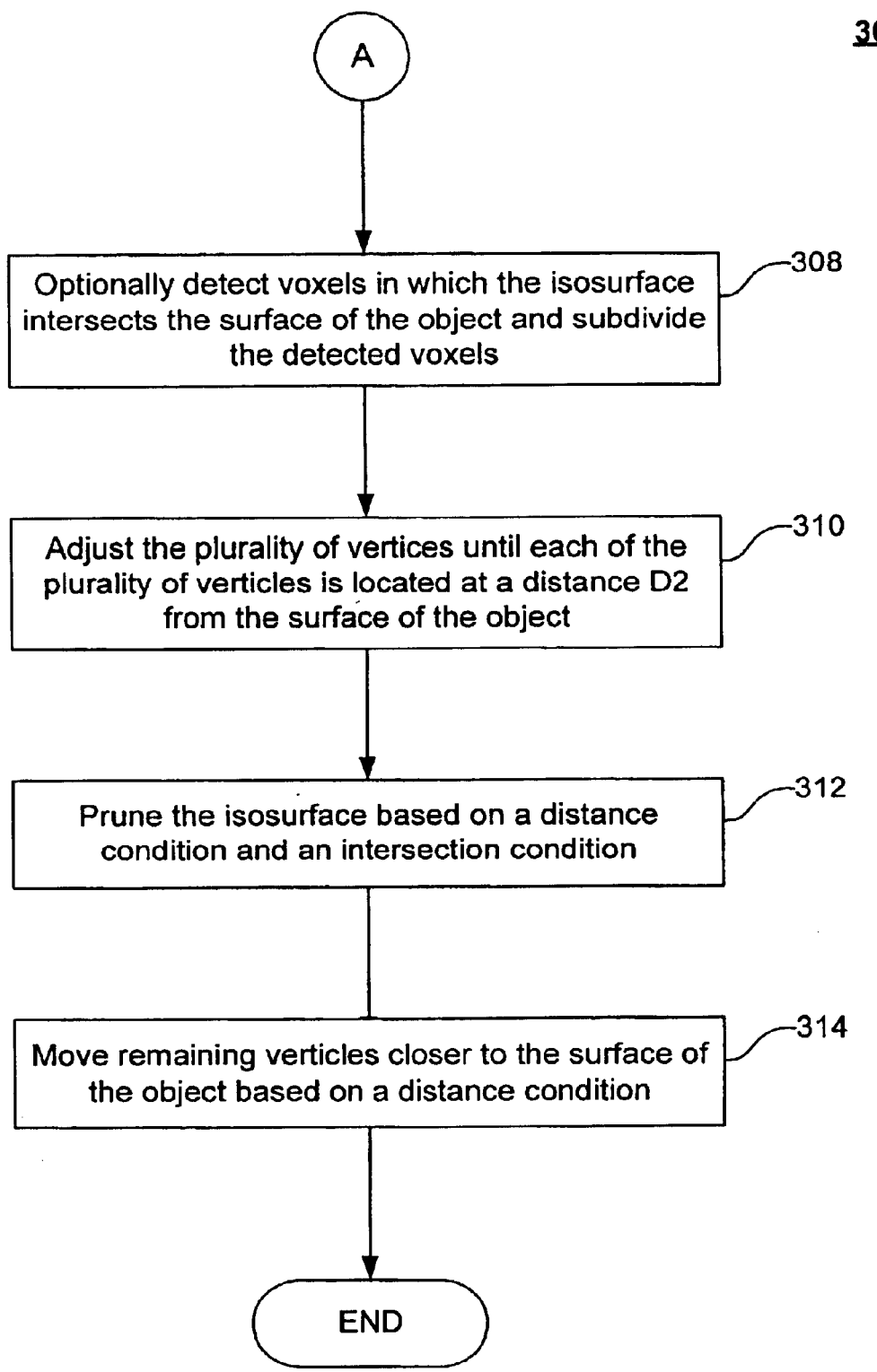

FIGS. 3A–3B illustrate a flowchart of the steps of a method 300 for forming an object proxy according to an embodiment of the invention. As noted above, an object proxy is a simplification of an object boundary that is useful for hardware-accelerated image-based rendering. Object proxies according to the present invention make it possible both to render more image-based objects in a single computer generated scene and to render these image-based objects using fewer views/textures than a conventional image-based rendering scheme.

In an embodiment, method 300 operates as follows. At least one object proxy formation parameter is specified. Using one or more of the specified formation parameters, a volume/grid is constructed around an object whose proxy is to be formed. An isosurface is created at a nominal distance D1 from the object's surface using a marching cubes algorithm on the volume/grid. In embodiments, an optional step is used to detect voxels of the volume in which the isosurface intersects the object's surface. These detected voxels are subdivided and a finer isosurface is created in the subdivided voxels. The vertices of the isosurface are then adjusted in an iterative manner until each vertex of the isosurface is located at a nominal distance D2 from the object's surface or until a maximum number of iterations have been performed.

An initial object proxy is formed by pruning the adjusted isosurface based on a distance condition (D3) and an intersection condition. This pruning step eliminates vertices and reduces the number of triangles or geometric complexity of the isosurface. A final object proxy is formed by moving in an iterative manner the vertices of the initial object proxy towards the object's surface. In an embodiment, the vertices of the initial object proxy are moved towards the object's surface until each vertex is on the object's surface, with no triangle of the object proxy being deeper than a distance D4 into the object, or until a maximum number of iterations have been performed.

As illustrated in FIGS. 3A–3B, method 300 comprises seven steps. Each of these steps will now be described in further detail with reference to the flowchart of FIGS. 3A–3B.

In step 302, as noted above, at least one object proxy formation parameter is input or specified. In embodiments of the invention, the input formation parameters include one or more of volume/grid resolution parameters N1, N2, and N3 and one or more distance parameters D1, D2, D3, and D4. In embodiments, at least some of the input formation parameters are default values. Thus, in embodiments, all of the parameters needed to form an object proxy according to the invention need not be specifically input or specified by a user of method 300.

The volume/grid resolution parameters N1, N2, and N3 are used to specify the resolution of a volume constructed around the object whose proxy is to be formed in accordance with the invention. These resolution formation parameters determine, for example, the size and the number of voxels of the volume that is formed around the object.

Specifying resolution parameters that create a fine resolution volume/grid will increase the amount of time that is needed to form an isosurface around the object. Creating a finer resolution volume/grid, however, will increase the precision of the isosurface. If the volume/grid created around an object is too coarse, the isosurface created around the object will intersect the surface of the object. For example, if the object is an ant, specifying a coarse grid may result in the isosurface intersecting the antennas of the ant. This can be solved by subdividing voxels as described above.

The distance parameters D1, D2, D3, and D4 are used to specify nominal distances from the object's surface. In embodiments, the distance D1 is used to specify a nominal distance from the object's surface where an initial isosurface is to be created. The distance D2 is used to specify a nominal distance from the object's surface where the vertices of the isosurface are moved prior to pruning. The distance D3 is used to specify a maximum nominal distance from the object's surface for the object proxy. The distance D4 is used to specify a maximum nominal penetration distance from the object's surface for a triangle of the object proxy (i.e., no triangle of the object proxy should be deeper than a distance D4 into the object).

In embodiments, only the nominal distance D3 is required to be specified. In these embodiments, the nominal distances D1, D2, and D4 are set to default values. For example, in one embodiment, if the nominal distance D2 is not specified, the value D2 is set to one-half the value D3. In this embodiment, if the nominal value for D1 is not specified, the value D1 is set to the same value as D2. The nominal value D4 can be set to zero if it is not specified, or it can be set to a default value slightly greater than zero. In other embodiments, other default values are used for the nominal distances D1, D2, and D4. For example, the nominal distance D1 can be larger or smaller than the nominal distance D2.

In some embodiments, the nominal distance D1 is specified if the object whose proxy is to be formed has concave surfaces that could be merged together by the marching cubes algorithm such as, for example, the two front legs of a cow (e.g., the isosurface of the two legs may be connected between the two legs). In these situations, the nominal distance D1 should be set to a small distance so that two close parts of the original object are not merged into a single shape.

In embodiments of the invention, specifying small values for D2 and D3 causes an object proxy to be formed that is similar to the original object. Specifying larger values for D2 and D3 will cause an object proxy to be formed that has only a few triangles.

In embodiments, a computer program running on a computer is used to obtain the object proxy formation parameters from a user.

In step 304, a volume is created around the object whose proxy is to be formed. This volume is created in accordance with the formation parameters specified or input in step 302. Typically, the volume formed around the object comprises many voxels. In embodiments, a regular volume/grid is formed around the object.

In step 306, an isosurface is created at a nominal distance D1 from the surface of the object whose proxy is to be formed. In embodiments, this isosurface is created using marching cubes algorithm on the volume/grid formed in step 304. The isosurface referred to here is the isosurface formed outside the object (i.e., the isosurface formed inside the object is not used). This results in each voxel of the volume/grid having an assigned set of triangles representing the isosurface. Each of the triangles of the isosurface has vertices that form the corners of the triangle.

Step 308 of method 300 is an optional step. As described above, if the volume/grid resolution specified in step 302 is too coarse, the isosurface created in step 304 will intersect the surface of the object whose proxy is to be formed. This condition can be rectified by optional step 308.

In optional step 308, voxels of the volume/grid in which the isosurface intersects the surface of the object are detected, and these detected voxels are subdivided to ensure that the isosurface does not intersect the object's surface. In embodiments of the invention, these voxels are detected by determining whether the object's surface intersects that isosurface in that voxel. In embodiments, both the detected voxels and those neighbors whose faces are intersected by the object surface are recursively subdivided to ensure that the isosurface does not intersect the object's surface. A finer isosurface is recomputed in the subdivided voxels.

In step 310, the vertices of the isosurface are adjusted until each of the vertices of the isosurface is located at a nominal distance D2 from the object's surface. In embodiments, the vertices are adjusted in an iterative manner, and the vertices are adjusted only for a selected number of iterations. Thus, in these embodiments, step 310 may end before each of the vertices of the isosurface is located at a nominal distance D2 from the object's surface.

Since the distance D1 may be either greater than the distance D2 or less than the distance D2, the vertices of the isosurface can be adjusted in step 310 by moving them either towards the object's surface or away from the object's surface.

In embodiments, the direction of the movement of the vertices of the isosurface is determined by a force field. This force field is defined by attractors located on the surface of the object. Each attreactor is a point on the object's surface that is closest to a center of a voxel that intersects the object's surface. In embodiments, the attractors are uniformly spread on the object's surface, and their density depends on the resolution of the volume/grid formed in step 304. In embodiments, the force (direction of movement) at an arbitrary point is determined by summing the directions to all attractors and divided by the square of the distance to each attractor. In other embodiments, other directions are used such as, for example, the sum of normals of triangles that contain the given vertex.

Step 310 is further described below with reference to FIG. 4.

In step 312, the isosurface is pruned based on a distance condition and an intersection condition to form an initial object proxy. As used herein, pruning means the process of eliminating vertices from the isosurface and re-triangulating the isosurface. In embodiments, at least one vertex of the isosurface formed in step 306 is eliminated in step 312.

In embodiments, the vertex having the minimal difference between the normals of the triangles that contain the vertex is selected and removed (i.e., vertices from the flattest regions of the isosurface are eliminated first). The neighboring vertices of the removed vertex are then connected in such a way that the new triangles formed do not intersect the object's surface (the intersection condition) and any point on the new triangles formed is no further than the nominal distance D3 from the object's surface (the distance condition). If such connections are not possible, the selected vertex is not removed, and it is marked as being unremovable until one of its neighboring vertices is removed.

After all vertices are removed that can be removed in accordance with the intersection condition and the distance condition, an attempt is made to collapse edges of triangles of the isosurface. In embodiments, the two triangles having the closest normals are selected first. An attempt is then made to collapse the common edge of the selected triangles while satisfying both the intersection condition and the distance condition of step 312. The new vertex from by collapsing an edge can be located anywhere on the former edge.

Step 312 ends when no vertex of the isosurface can be removed and no triangle edge can be collapsed without violating either the intersection condition of the distance condition of the step.

The result of step 312 is the formation of an initial object proxy according to the invention. Step 312 is further described below with reference to FIG. 5.

In step 314, the vertices of the initial object proxy are moved closer to the object's surface based on a distance condition. In embodiments, the vertices on the initial object proxy are moved in an iterative manner towards the object's surface until each vertex is on the object's surface, with no triangle of the object proxy being deeper than a nominal distance D4 into the object, or until a maximum number on move iterations have been performed. In embodiments, the nominal distance D4 is set equal to zero so that the triangles do not penetrate the object's surface. Simulations show, however, that allowing some penetration of the object's surface can improve image quality. Image quality is degraded if the nominal distance D4 is too large.

The result of step 314 is the formation of a final object proxy according to the invention. Step 314 is further described below with reference to FIG. 6.

Figure 4:
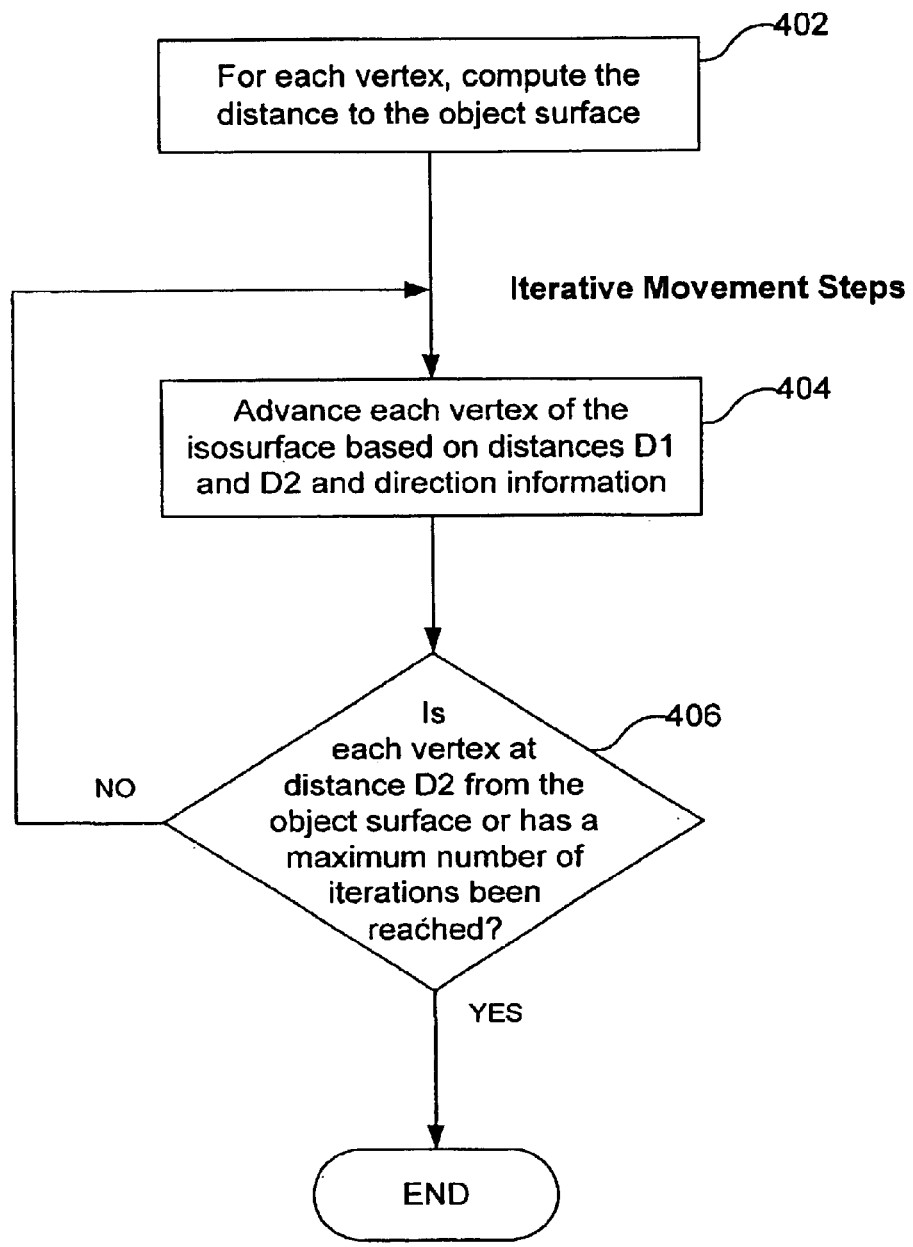
FIG. 4 illustrates a flowchart of a method for adjusting the location of vertices according to an embodiment of the invention.

FIG. 4 illustrates an example method for implementing step 310 of method 300. As shown in FIG. 4, the example method comprises steps 402, 404, and 406.

In step 402, the distance from each vertex of the isosurface to the object's surface is computed. These computed distances are used to determine how far each of the vertices needs to be moved.

In step 404, each vertex of the isosurface is moved a small distance from D1 towards D2. As described above, in embodiments, attractors are used to determine the direction of movement. In an embodiment, each vertex is moved in an iterative manner by calculating the difference between the current distance and the desired distance D2, and this calculated distance is multiplied by a factor (e.g., 1/N or 2/N) to determine how far to move the vertex during the given iteration.

In step 406, two looping conditions are checked to see if additional adjustments of the vertices are required. One looping condition that is checked is whether each vertex is at a nominal distance D2 from the object's surface. If this condition is satisfied, step 310 ends. Another looping condition that is checked is whether a maximum number of iterations N have been reached. If a maximum number of iterations have been reached, step 310 ends regardless of the location of each vertex of the isosurface.

Figure 5:
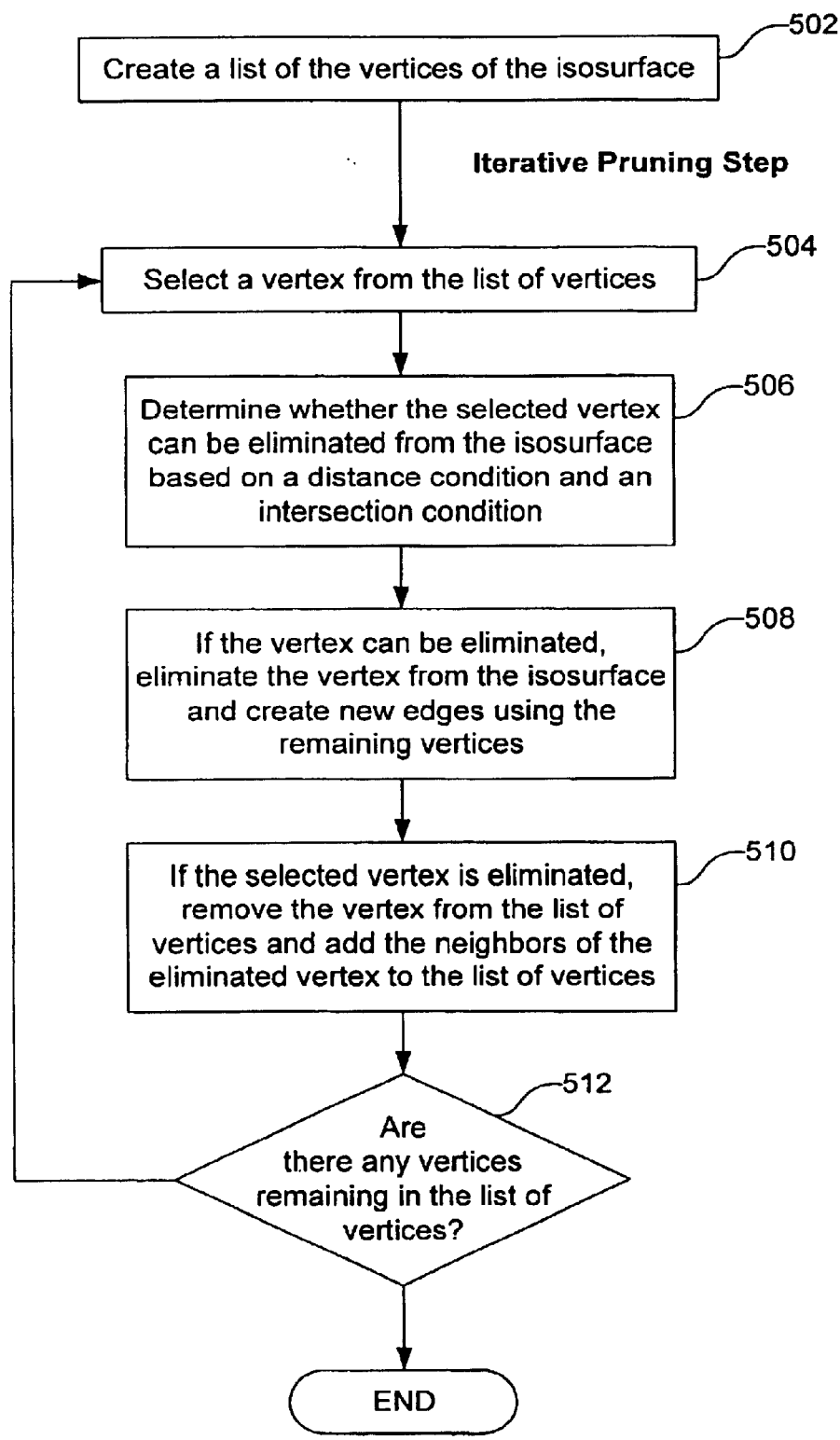
FIG. 5 illustrates a flowchart of a method for pruning a surface to eliminate vertices according to an embodiment of the invention.

FIG. 5 illustrates an example method for implementing step 312 of method 300. As shown in FIG. 5, the example method comprises steps 502, 504, 506, 508, 510 and 512.

In step 502, a list is created that contains all of the vertices of the isosurface. This list is used to identify vertices that can potentially be eliminated without violating the intersection condition and the distance condition of step 312.

In step 504, a vertex of the isosurface is selected from the list of vertices. As described above with regard to step 312, in embodiments the vertex on the list having the minimal difference between the normals of the triangles that contain the vertex is selected.

In step 506, the intersection condition and the distance condition are used to determine whether the selected vertex can be eliminated from the isosurface and new triangles formed using neighboring vertices. If the selected vertex cannot be eliminated, it is removed from the list of vertices.

In step 508, the selected vertex is eliminated from the isosurface, if it can be eliminated, and new triangles are formed. As described above, in embodiments the selected vertex is eliminated and the neighboring vertices of the removed vertex are connected in such a way that the new triangles formed do not intersect the object's surface (the intersection condition) and any point on the new triangles formed is no further than the nominal distance D3 from the object's surface (the distance condition). If such connections are not possible, the selected vertex is not removed.

In step 510, if the selected vertex is eliminated from the isosurface, it is removed from the list of vertices and its neighboring vertices are added to the list of vertices for possible future elimination.

In step 512, a looping condition is checked to see if any additional vertices need to be checked for possible elimination. This looping condition is the presence of a vertex in the list of vertices. If there are no more vertices in the list of vertices, step 312 ends.

Figure 6:
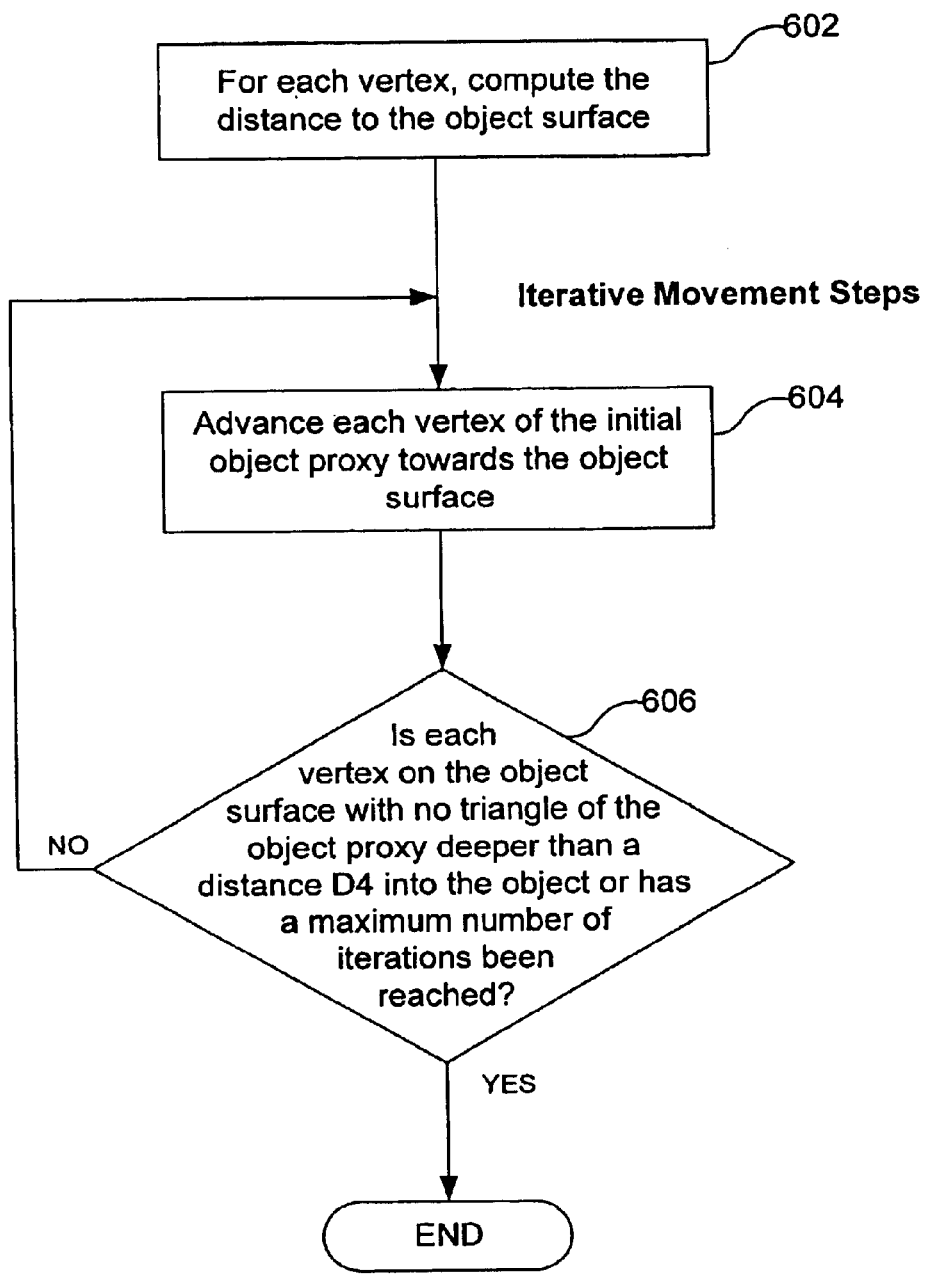
FIG. 6 illustrates a flowchart of a method for advancing the vertices of an object proxy towards the surface of an object according to an embodiment of the invention.

FIG. 6 illustrates an example method for implementing step 314 of method 300. As shown in FIG. 6, the example method comprises steps 602, 604, and 606.

In step 602, the distance from each vertex of the initial object proxy to the object's surface is computed. These computed distances are used to determine how far each of the vertices of the initial object proxy can be moved.

In step 604, each vertex of the initial object proxy is advanced a small distance towards the object's surface. As described above, in embodiments, attractors are used to determine the direction of movement. In an embodiment, each vertex is moved in an iterative manner by multiplying the current distance by a factor to determine how far to move the vertex during the given iteration.

In step 606, two looping conditions are checked to see if additional advancements of the vertices are required. One looping condition that is checked is whether each vertex on the object's surface with no triangle of the object proxy being deeper than a nominal distance D4 into the object. If this condition is satisfied, step 314 ends. Another looping condition that is checked is whether a maximum number of iterations have been reached. If a maximum number of iterations have been reached, step 314 ends regardless of the location of each vertex of the object proxy.

Figure 7:
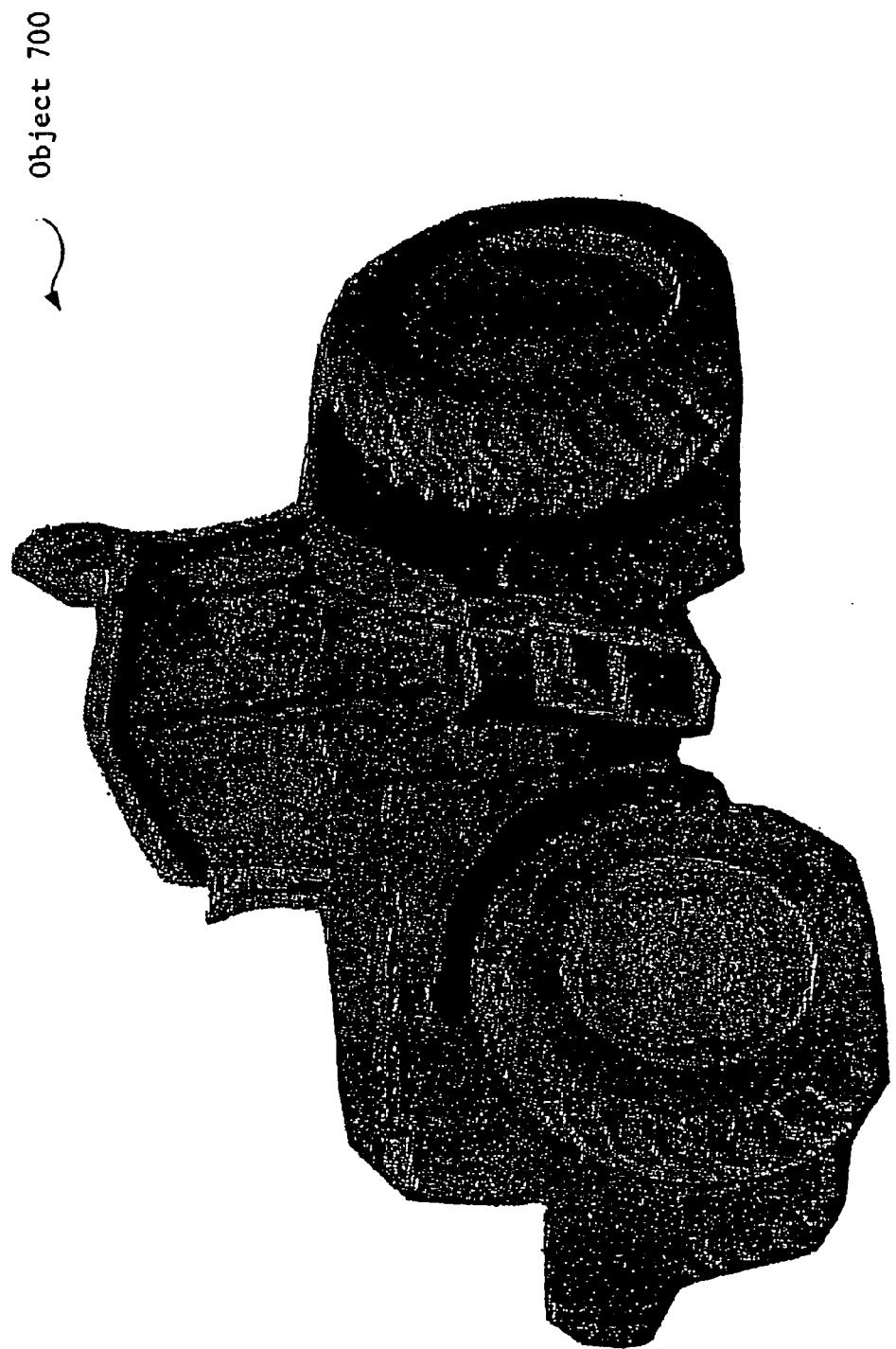
FIG. 7 illustrates an example object according to an embodiment of the invention.

FIG. 7 illustrates an example object 700 whose proxy can be formed using the present invention. Object 700 is a tractor having a complex geometry.

FIG. 8 illustrates how a volume/grid 800 is formed around an object (i.e., object 700) in accordance with step 302 of method 300. Volume/grid is made up of a plurality of voxels 802.

Figure 9A:
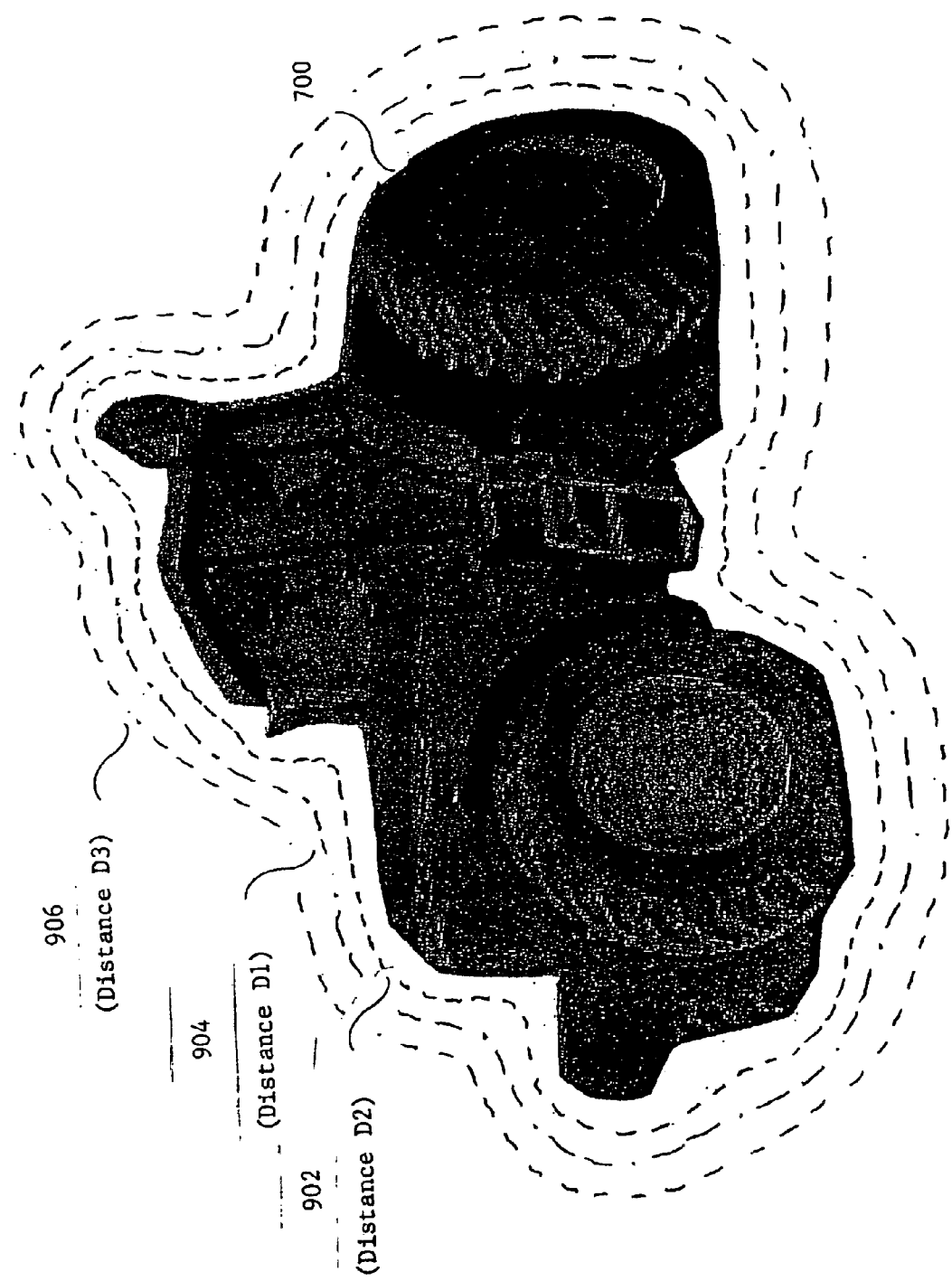
FIG. 9A illustrates an example relationship of three distances (D1, D2, and D3) to the surface of the object of FIG. 7 according to an embodiment of the invention.

FIG. 9A illustrates an example relationship of the nominal distances D1, D2, and D3 of method 300 to the object 700. The nominal distance D1 is illustrated by a surface 904 that surrounds the object 700. The nominal distance D2 is illustrated by a surface 902 that surrounds the object 700. The nominal distance D3 is illustrated by a surface 906 that surrounds the object 700. As noted herein, other relationships can exist in accordance with the invention. For example, in embodiments, the nominal distance D1 is farther away from the surface of object 700 than the nominal distance D3.

Figure 9B:
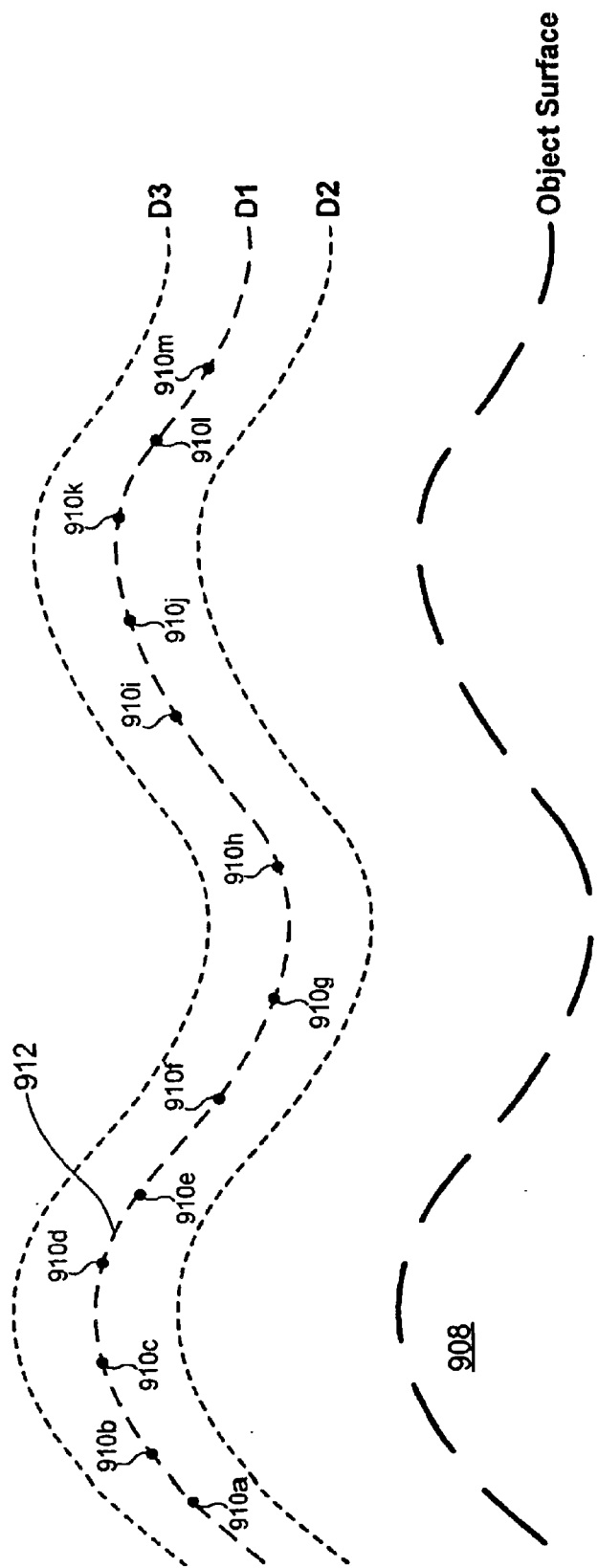
FIG. 9B illustrates the vertices of an isosurface formed at a distance D1 from a surface having an arbitrary shape.

FIG. 9B illustrates a plurality of vertices 910 of an isosurface 912 formed around a surface 908 in accordance with step 306 of method 300. Surface 908 has an arbitrary shape. As shown in FIG. 9A, each vertex 910 is at the nominal distance D1 from the object's surface.

Figure 9C:
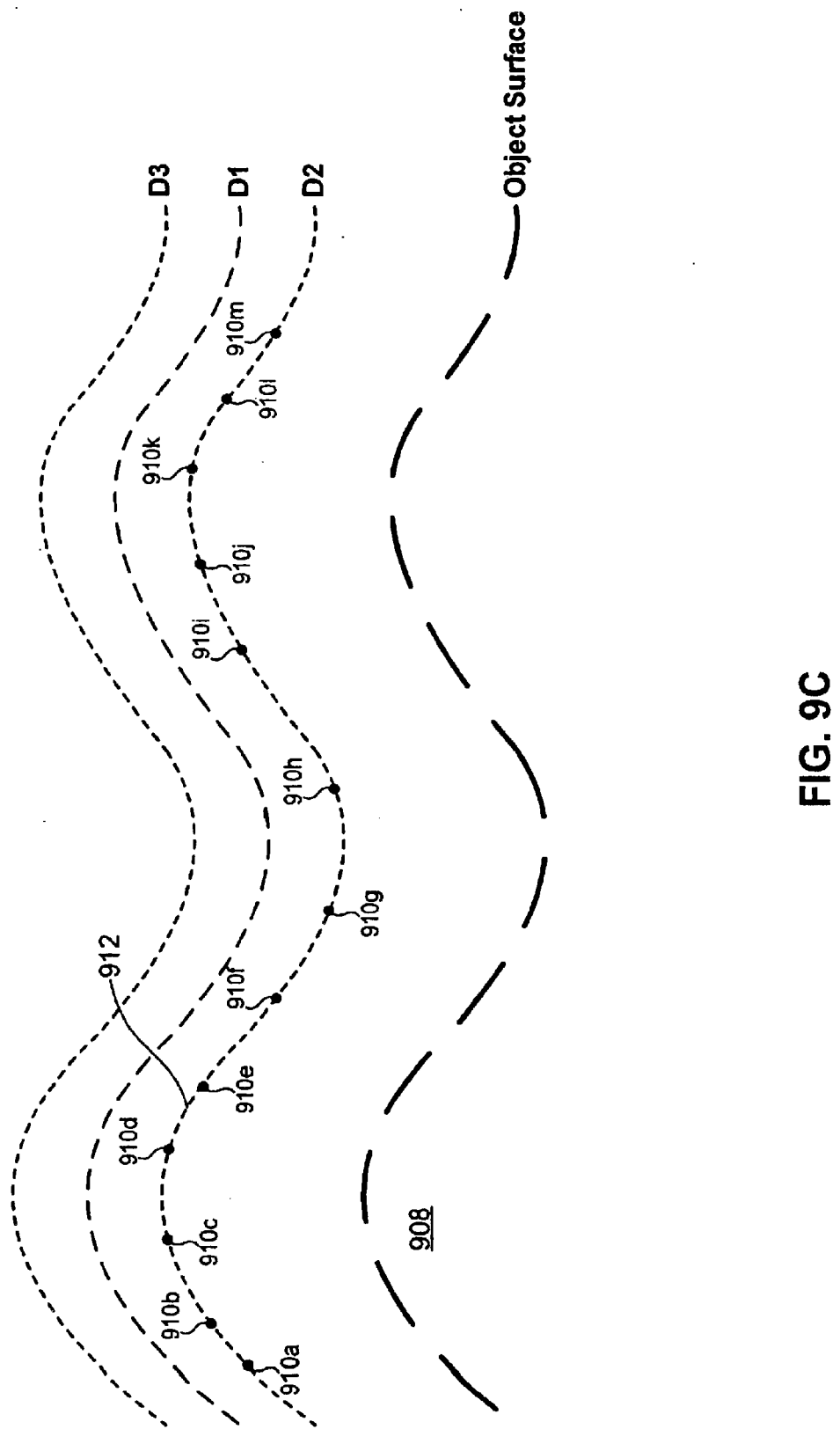
FIG. 9C illustrates the vertices of FIG. 9B after they have been moved to a distance D2 from the surface shown in FIG. 9B according to an embodiment of the invention.

FIG. 9C illustrates the vertices 910 of the isosurface 912 after they have been adjusted in accordance with step 310 of method 300 to a nominal distance D2 from the surface 908. In the embodiment shown in FIG. 9C, the nominal distance D2 is closer to the surface 908 than the nominal distance D1. In other embodiments of the invention, however, the nominal distance D2 can be further away from the surface 908 that the nominal distance D1.

Figure 9D:
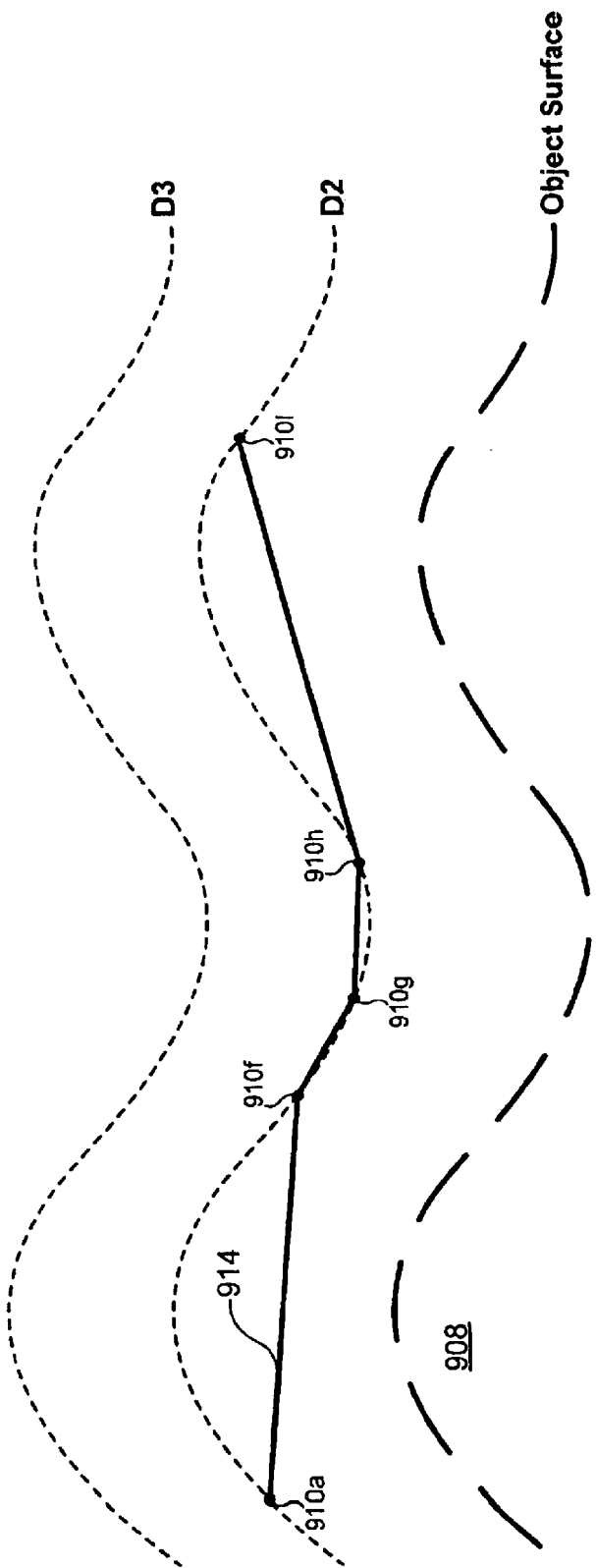
FIG. 9D illustrates the elimination of some of the vertices of FIG. 9B according to an embodiment of the invention.

FIG. 9D illustrates the pruning or elimination of some of the vertices 910 in accordance with step 312 of method 300 to form an object proxy 914. As shown in FIG. 9D, the vertices 910b, 910c, 910d, 910e, 910g, 910i, 910j, 910k, and 910m have been eliminated without having any triangle of the object proxy 914 insect the surface 908 and without having any point on a triangle of the object proxy 914 farther than the nominal distance D3 from the surface 908.

As can be seen in FIG. 9D, it is possible to move the vertices of object proxy 914 closer to the surface 908 in accordance with step 314 of the method 300.

Figure 10:
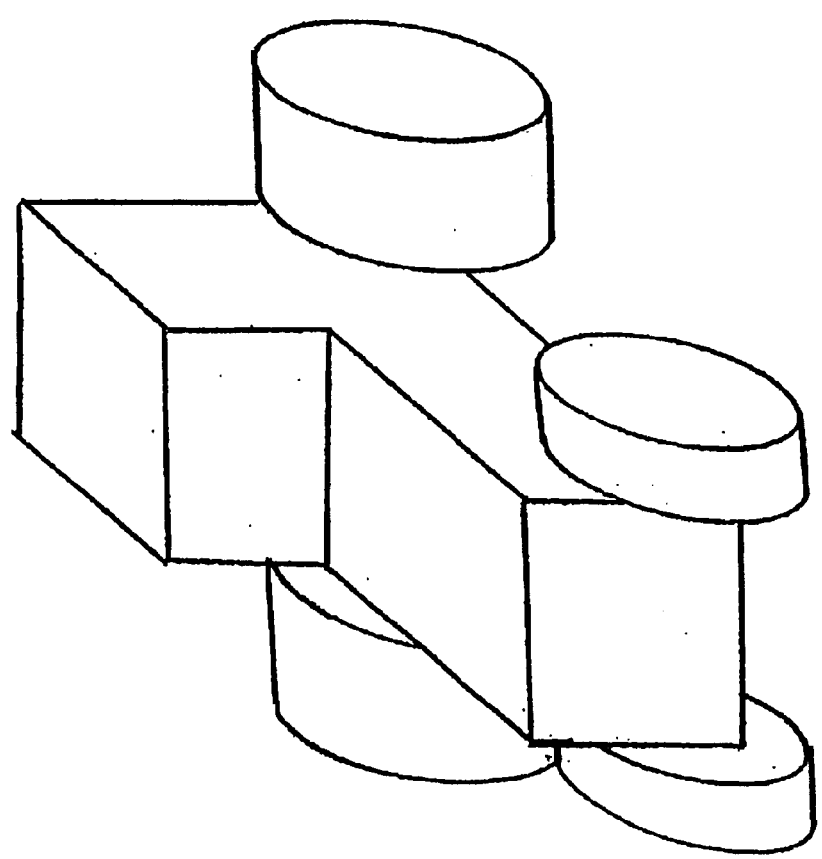
FIG. 10 illustrates an example object proxy for the object of FIG. 7 according to an embodiment of the invention.

FIG. 10 illustrates an example object proxy 1000 for the object 700 of FIG. 7 according to an embodiment of the invention. As can be seen by comparing FIGS. 7 and 10, the surface of the object proxy 1000 is not as complex as the surface of the object 700. Object proxy 1000 is illustrative and not intended to limit the invention described herein As described herein, the invention is very flexible, and further features and advantages of the present invention will become apparent to a person skilled in the relevant art given the description of the invention herein.

Further Object Proxy Former Embodiments

Figure 11A:
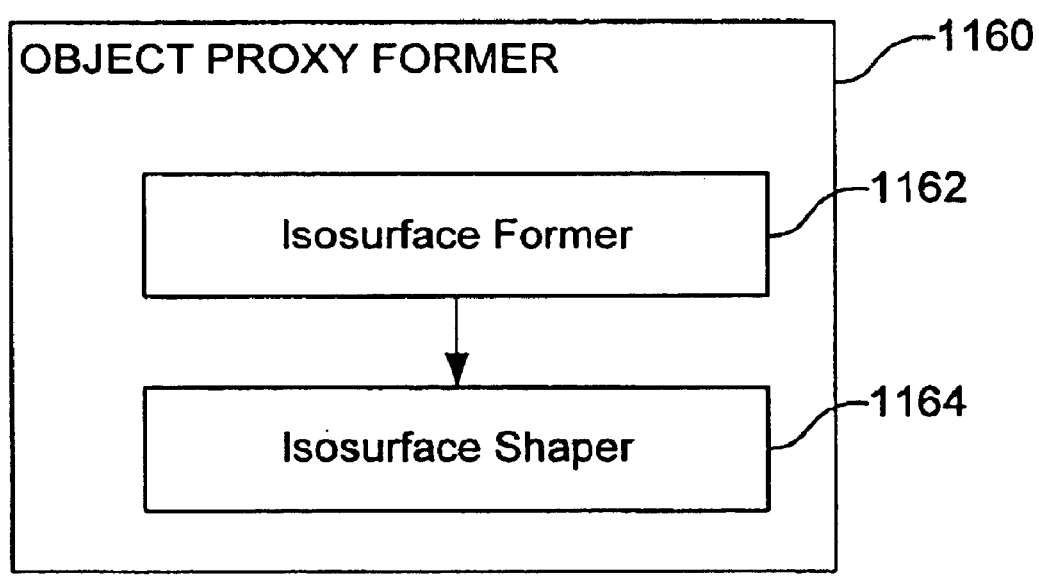
FIG. 11A is a diagram of an object proxy former according to an embodiment of the present invention.

FIG. 11A is a diagram of an object proxy former 1160 according to an embodiment of the present invention. Object proxy former 1160 forms an object proxy that approximates the geometry of an object. Object proxy former 1160, includes isosurface former 1162 and isosurface shaper 1164. Isosurface former 1162 forms an isosurface within a volume encompassing an object. Isosurface shaper 1164 adjusts the isosurface relative to the surface of the object and prunes the isosurface to obtain the object proxy. In one example implementation, object proxy former 1160 comprises control logic and/or program code for carrying out each of the steps 300–606 described above with respect to FIGS. 3–6. For example, isosurface former 1162 comprises control logic and/or program code for carrying out each of the steps 302–308 described above with respect to FIGS. 3A and 3B. Isosurface shaper 1164 comprises control logic and/or program code for carrying out each of the steps 310–314, and 402–606 as described above with respect to FIGS. 3B–6. These are examples only and not intended to limited the present invention. Functionality can be distributed in alternate arrangements between processing components in FIG. 11A as would be apparent to a person skilled in the art given this description.

In addition, the present invention, including each of steps 300–606 described above with respect to FIGS. 3–6, and object proxy former 1160 and its components 1162, 1164 described with respect to FIG. 11A, can be implemented in software, firmware, hardware or any combination thereof. Various features of the invention (including each of steps 300–606 described above with respect to FIGS. 3–6, and object proxy former 1160 and its components 1162, 1164 described with respect to FIG. 11A) can be implemented in any one of the layers 110–160 of architecture 100, or in any combination of layers 110–160 of architecture 100 as described in FIG. 1. Various features of the invention (including each of steps 300–606 described above with respect to FIGS. 3–6, and object proxy former 1160 and its components 1162, 1164 described with respect to FIG. 11A) can also be implemented in system 200 as described with respect to FIG. 2 above or in system 1100 as described with respect to FIG. 11B below. These are examples only and not intended to limit the present invention. Functionality can also be distributed in alternate arrangements between processing components as would be apparent to a person skilled in the art given this description.

Figure 11B:
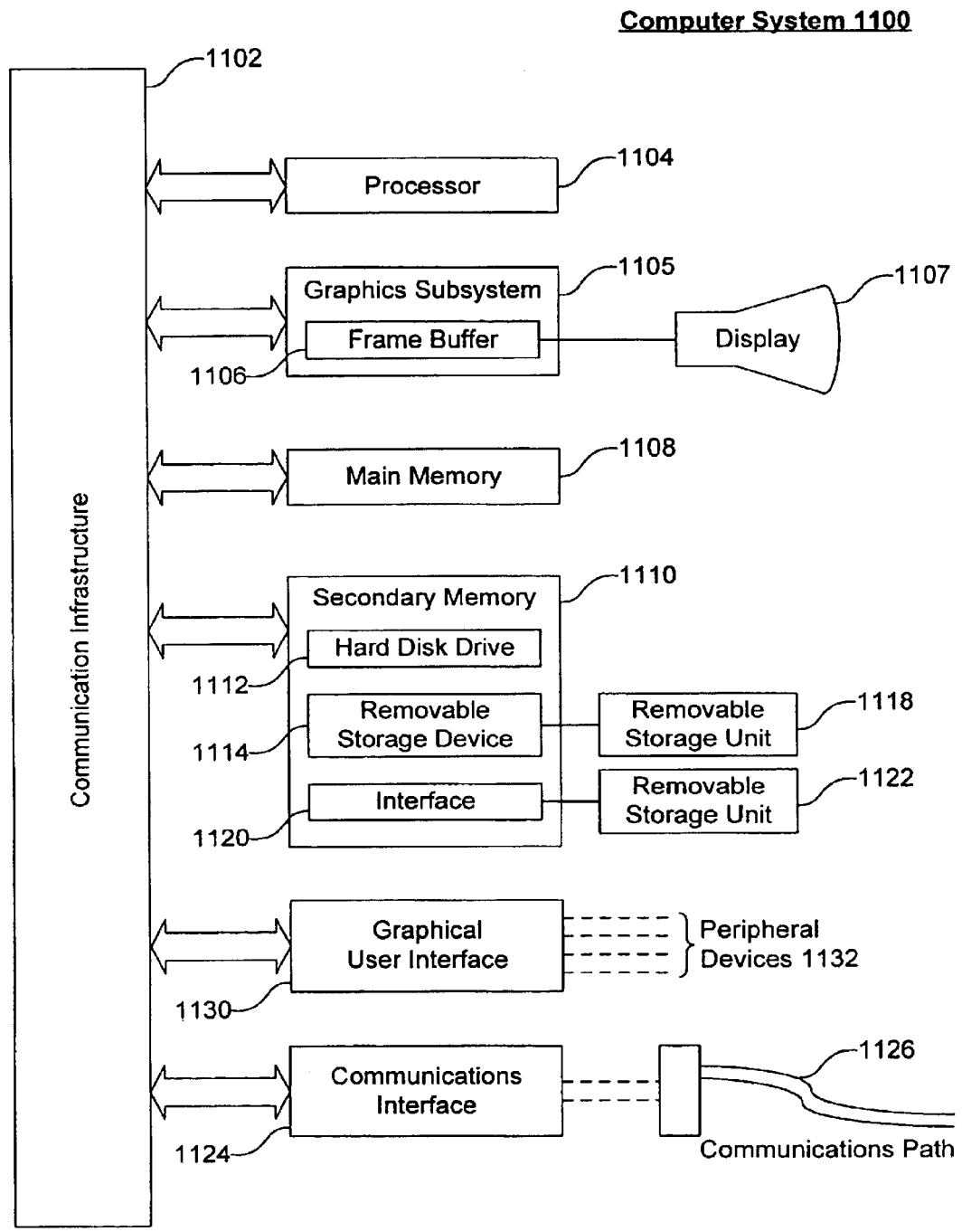
FIG. 11B illustrates an example computer system that can be used to implement embodiments of the invention.

Example Computer System for Implementing Computer Program Product Embodiments of the Invention FIG. 11B illustrates an example of a computer system 1100 that can be used to implement computer program product embodiments of the present invention. This example computer system is illustrative and not intended to limit the present invention. Computer system 1100 represents any single or multi-processor computer. Single-threaded and multi-threaded computers can be used. Unified or distributed memory systems can be used.

Computer system 1100 includes one or more processors, such as processor 1104, and one or more graphics subsystems, such as graphics subsystem 1105. One or more processors 1104 and one or more graphics subsystems 1105 can execute software and implement all or part of the features of the present invention described herein. Graphics subsystem 1105 can be implemented, for example, on a single chip as a part of processor 1104, or it can be implemented on one or more separate chips located on a graphic board. Each processor 1104 is connected to a communication infrastructure 1102 (e.g., a communications bus, cross-bar, or network). After reading this description, it will become apparent to a person skilled in the relevant art how to implement the invention using other computer systems and/or computer architectures.

Computer system 1100 also includes a main memory 1108, preferably random access memory (RAM), and can also include secondary memory 1110. Secondary memory 1110 can include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118 represents a floppy disk, magnetic tape, optical disk, etc., which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means can include, for example, a removable storage unit 1122 and an interface 1120. Examples can include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

In an embodiment, computer system 1100 includes a frame buffer 1106 and a display 1107. Frame buffer 1106 is in electrical communication with graphics subsystem 1105. Images stored in frame buffer 1106 can be viewed using display 1107. Many of the features of the invention described herein are performed within the graphics subsystem 1105.

Computer system 1100 can also include a communications interface 1124. Communications interface 1124 allows software and data to be transferred between computer system 1100 and external devices via communications path 1126. Examples of communications interface 1124 can include a modem, a network interface (such as Ethernet card), a communications port, etc. Software and data transferred via communications interface 1124 are in the form of signals which can be electronic, electromagnetic, optical or other signals capable of being received by communications interface 1124, via communications path 1126. Note that communications interface 1124 provides a means by which computer system 1100 can interface to a network such as the Internet.

Computer system 1100 can include one or more peripheral devices 1132, which are coupled to communications infrastructure 1102 by graphical user-interface 1130. Example peripheral devices 1132, which can from a part of computer system 1100, include, for example, a keyboard, a pointing device (e.g., a mouse), a joy stick, and a game pad. Other peripheral devices 1132, which can form a part of computer system 1100 will be known to a person skilled in the relevant art given the description herein.

The present invention can be implemented using software running (that is, executing) in an environment similar to that described above with respect to FIG. 7. In this document, the term "computer program product" is used to generally refer to removable storage unit 1118, a hard disk installed in hard disk drive 1112, or a carrier wave or other signal carrying software over a communication path 1126 (wireless link or cable) to communication interface 1124. A computer useable medium can include magnetic media, optical media, or other recordable media, or media that transmits a carrier wave. These computer program products are means for providing software to computer system 1100.

Computer programs (also called computer control logic) are stored in main memory 1108 and/or secondary memory 1110. Computer programs can also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112, or communications interface 1124. Alternatively, the computer program product may be downloaded to computer system 1100 over communications path 1126. The control logic (software), when executed by the one or more processors 1104, causes the processor(s) 1104 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

Conclusion

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

Various embodiments of the present invention have been described above, which are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for forming an object proxy that approximates the geometry of an object, comprising:

(a) forming a volume that encompasses the object;

(b) forming an isosurface within the volume formed in step (a);

(c) adjusting the isosurface relative to a surface of the object; and (d) pruning the isosurface to obtain the object proxy.

2. The method of claim 1, wherein said isosurface forming step (b) comprises forming an isosurface at a first distance from a surface of the object.

3. The method of claim 2, wherein said volume forming step (a) comprises forming a volume made up of voxels that encompass the object, and wherein said isosurface forming step (b) includes determining sets of vertices for the voxels such that the sets of vertices define polygons representing the isosurface at the first distance from the surface of the object.

4. The method of claim 3, further comprising:

detecting voxels in which the isosurface intersects the surface of the object; and subdividing the detected voxels.

5. The method of claim 3, wherein said isosurface adjusting step (c) comprises (1) adjusting at least some of the vertices of the isosurface until each vertex is at or near a second distance from the surface of the object.

6. The method of claim 5, wherein said adjusting step (c)(1) includes iteratively advancing each vertex of the isosurface by an amount based the first distance, a second distance, and direction information.

7. The method of claim 3, wherein said isosurface pruning step (d) comprises pruning the isosurface based on a distance condition and an intersection condition.

8. The method of claim 3, wherein said isosurface pruning step (d) comprises iteratively pruning a list of vertices of the isosurface including the steps of:

selecting a vertex;

determining whether the selected vertex can be eliminated from the isosurface based on a distance condition and an intersection condition; and when a selected vertex can be eliminated, eliminating the vertex and creating new edges using remaining vertices, and removing the selected vertex from the list of vertices.

9. The method of claim 3, further comprising: receiving at least one object proxy formation parameter selected from the group of a grid resolution (N1×N2×N3) representing the resolution of the voxels in the volume, a first distance value (D1) representing the first distance between an initial isosurface and the object surface, a second distance value (D2) representing the distance between an initial object proxy obtained after said pruning step and the object surface, a third distance value (D3) representing the maximum allowed distance between a vertice in the isosurface and the object surface during said pruning step, and a fourth distance value (D4) representing a maximum depth for vertices from the object surface.

10. The method of claim 1, wherein the object proxy obtained in said pruning step (d) comprises an initial object proxy, and further comprising iteratively moving at least some of the vertices in the initial object proxy closer to the surface of the object.

11. The method of claim 10, the sets of vertices in the initial object proxy define polygons, and wherein said iteratively moving step comprises:

for each vertex, computing the distance of the respective vertex to the object surface; and advancing each vertex of the initial object proxy toward the object surface until each vertex is on or near the object surface with no polygons deeper than a predetermined distance or a predetermined number of iterations has been reached.

12. An apparatus for forming an object proxy that approximates the geometry of an object, comprising:

(a) an isosurface former that forms an isosurface within a volume encompassing an object; and (b) an isosurface shaper that adjusts the isosurface relative to the surface of the object and prunes the isosurface to obtain the object proxy.

13. The apparatus of claim 12, wherein said isosurface former forms a volume made up of voxels that encompass the object, and determines sets of vertices for the voxels such that the sets of vertices define polygons representing the isosurface at a first distance from the surface of the object.

14. The apparatus of claim 13, wherein said isosurface shaper adjusts at least some of the vertices of the isosurface until each vertex is at or near a second distance from the surface of the object.

15. The apparatus of claim 14, wherein said isosurface shaper iteratively adjusts each vertex of the isosurface by an amount based the first distance, a second distance, and direction information.

16. The apparatus of claim 14, wherein said isosurface shaper prunes the isosurface based on a distance condition and an intersection condition to obtain an initial object proxy.

17. The apparatus of claim 16, wherein said isosurface shaper further iteratively moves at least some of the vertices in the initial object proxy closer to the surface of the object to obtain the object proxy.

18. A system for forming an object proxy that approximates the geometry of an object, comprising:

(a) means for forming a volume that encompasses the object;

(b) means for forming an isosurface within the volume;

(c) means for adjusting the isosurface relative to a surface of the object; and (d) means for pruning the isosurface to obtain the object proxy.

19. The system of claim 18, wherein said isosurface forming means (b) comprises means for forming an isosurface at a first distance from a surface of the object.

20. The system of claim 19, wherein said volume forming means (a) comprises means for forming a volume made up of voxels that encompass the object, and wherein said isosurface forming means (b) includes means for determining sets of vertices for the voxels such that the sets of vertices define polygons representing the isosurface at the first distance from the surface of the object.

21. The system of claim 20, further comprising:

means for detecting voxels in which the isosurface intersects the surface of the object; and means for subdividing the detected voxels.

22. The system of claim 20, wherein said isosurface adjusting means (c) comprises (1) means for adjusting at least some of the vertices of the isosurface until each vertex is at or near a second distance from the surface of the object.

23. The system of claim 22, wherein said adjusting means (c)(1) includes means for iteratively advancing each vertex of the isosurface by an amount based the first distance, a second distance, and direction information.

24. The system of claim 20, wherein said isosurface pruning means (d) comprises means for pruning the isosurface based on a distance condition and an intersection condition.

25. The system of claim 20, wherein said isosurface pruning means (d) comprises means for iteratively pruning a list of vertices of the isosurface including:

means for selecting a vertex;

means for determining whether the selected vertex can be eliminated from the isosurface based on a distance condition and an intersection condition; and means for eliminating the vertex from the list of vertices and creating new edges using remaining vertices when a selected vertex can be eliminated.

26. The system of claim 20, wherein the object proxy obtained by said pruning means (d) comprises an initial object proxy, and further comprising means for iteratively moving at least some of the vertices in the initial object proxy closer to the surface of the object.

27. The system of claim 26, wherein the sets of vertices of the initial object proxy define polygons, and said iterative moving means comprises:

means for computing the distance of each vertex to the object surface; and means for advancing each vertex of the initial object proxy toward the object surface until each vertex is on or near the object surface with no polygons deeper than a predetermined distance or until a predetermined number of iterations has been reached.

28. A computer program product comprising computer usable media having computer readable program code embodied in said media for causing a processor to form an object proxy, said computer readable program code comprising:

first program code that enables the processor to form a volume that encompasses the object;

second program code that enables the processor form an isosurface within the volume;

third program code that enables the processor to adjust the isosurface relative to a surface of the object; and fourth program code that enables the processor to prune the isosurface to obtain the object proxy.

* * * * *

UNITED STATES PATENT AND TRADEMARK OFFICE
CERTIFICATE OF CORRECTION

| | | |
|---|---|---|
| PATENT NO. | : 6,831,642 B2 | Page 1 of 1 |
| APPLICATION NO. | : 10/197822 | |
| DATED | : December 14, 2004 | |
| INVENTOR(S) | : Radomir Mech | |

It is certified that error appears in the above-identified patent and that said Letters Patent is hereby corrected as shown below:

<u>Column 1</u>
Line 10, "No. to be assigned" replace with --No. 10/197,845--.

Signed and Sealed this

Twelfth Day of August, 2008

JON W. DUDAS
*Director of the United States Patent and Trademark Office*